Patented Nov. 27, 1923.

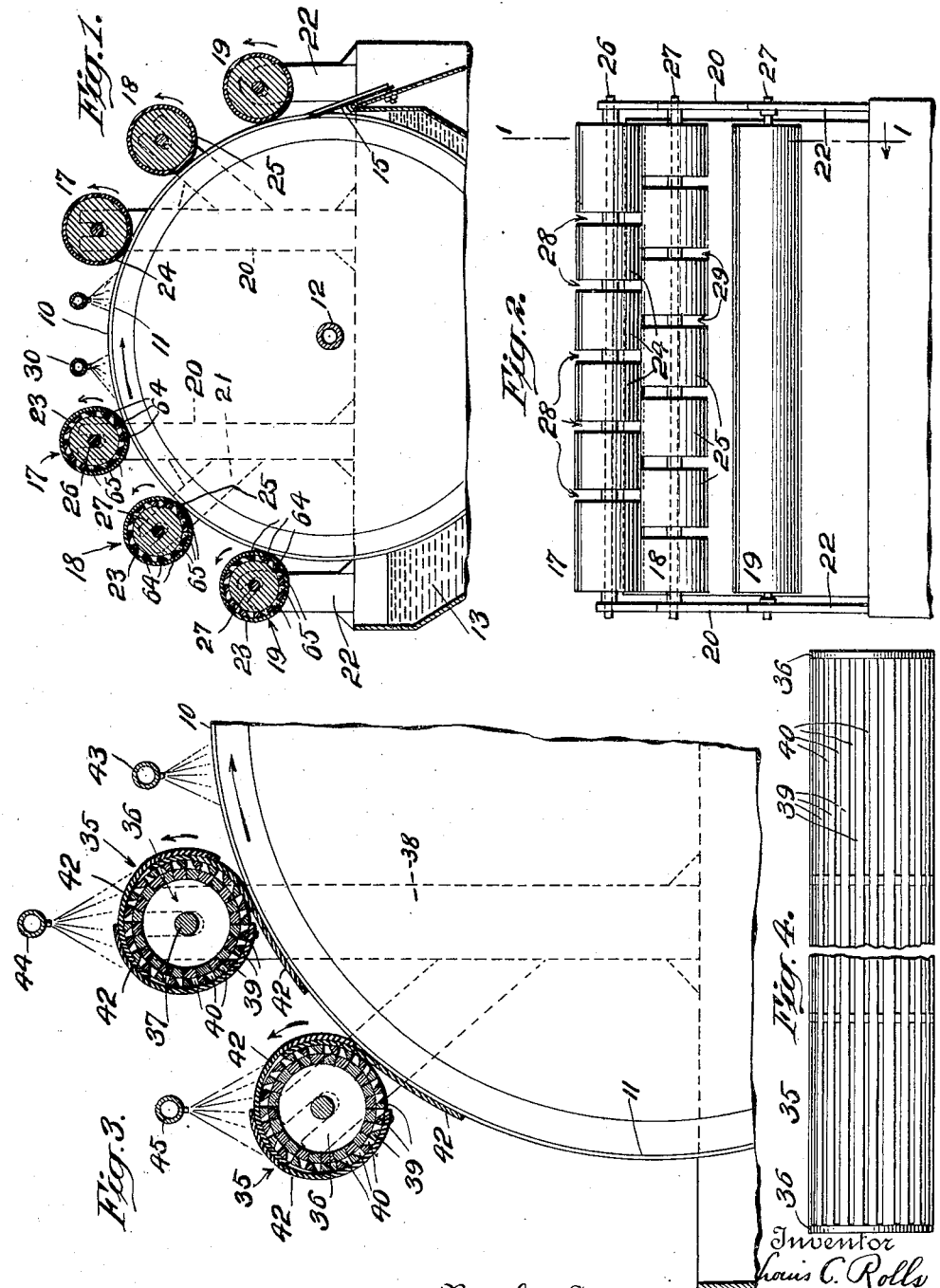

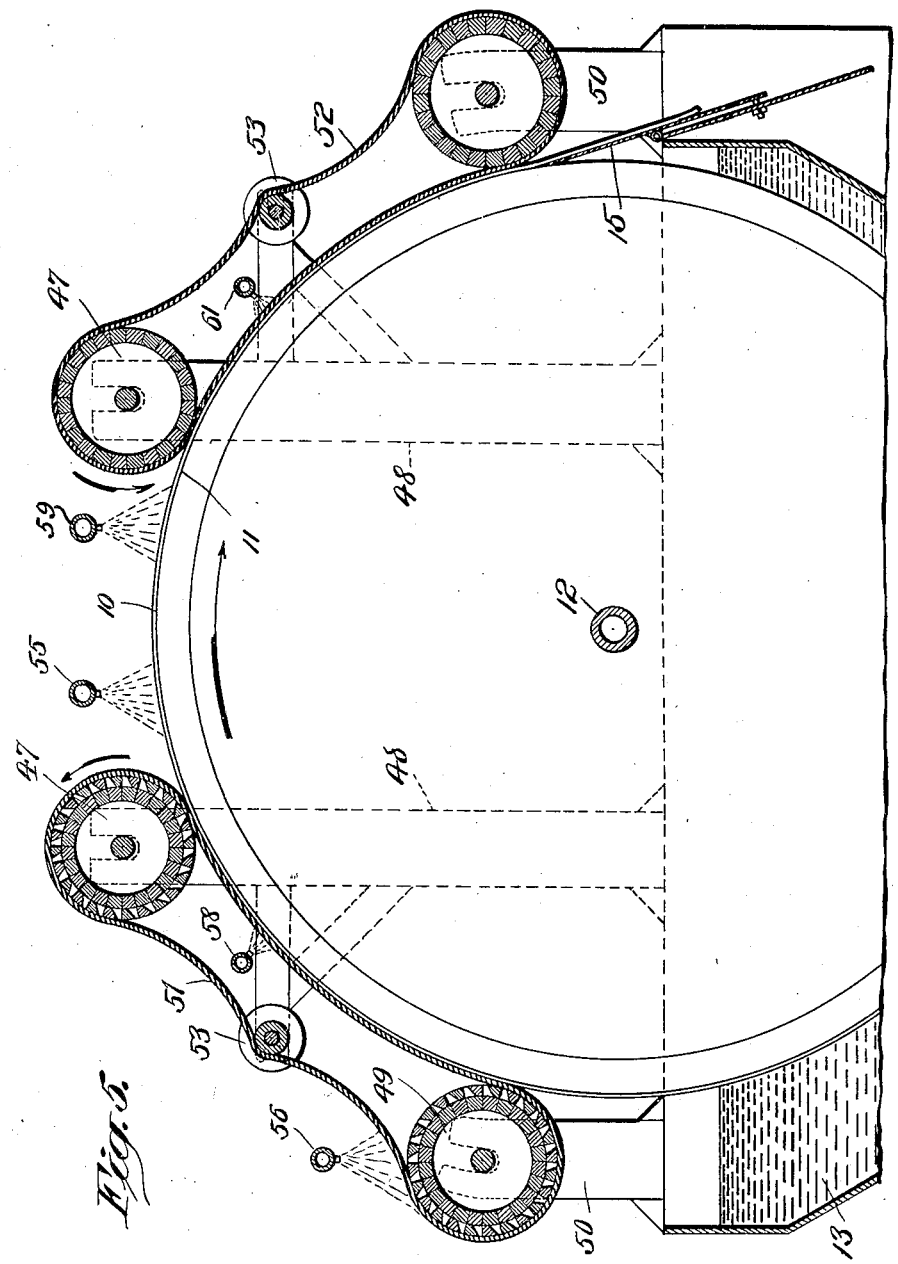

1,475,244

UNITED STATES PATENT OFFICE.

LOUIS C. ROLLS, OF HEDLEY, BRITISH COLUMBIA, CANADA.

FILTER.

Application filed July 10, 1920. Serial No. 395,403.

*To all whom it may concern:*

Be it known that I, LOUIS C. ROLLS, a citizen of Dominion of Canada, and a resident of Hedley, Province of British Columbia, Dominion of Canada, have invented certain new and useful Improvements in Filters, of which the following is a specification.

The present invention relates to filters, and more particularly to vacuum filters adapted for use in metallurgical and industrial operations.

Vacuum filters adapted for use in metallurgical and similar operations are provided with a filtering surface upon which is formed a layer of the mineral bearing slimes or pulp to be washed or filtered. The washing or filtering is effected by a vacuum which is created at the filtering surface and by this vacuum the moisture is drawn from the pulp. The pulp covering the filtering surface is frequently termed the cake. It is sometimes found desirable or necessary to wash the solution from this cake either with a barren solution or with water and sometimes with both. Considerable difficulty has heretofore been experienced in effecting a thorough washing of the solution from the cake because of the comparatively small amount of wash fluid which can be drawn through the cake under the usual conditions of operation. This is especially true of continuous vacuum drum filters, such as the Oliver or Portland types. When streams or sprays of wash fluid are applied to the ascending side of these filters, the excess fluid, that is, the fluid which is not drawn through the cake by the vacuum, runs down into the pulp receptacle or compartment, causing a detrimental dilution of the pulp. When streams or sprays of wash fluid are applied to the descending or discharge side of the filter their volume must be similarly limited because here the excess fluid flows down into the pulp compartment through the cracks formed by the "blow" just before the cake is discharged from the filter. And also in cases where a so-called dry discharge is required it is not practicable to apply wash fluid in any appreciable quantity whatever. For these reasons the washing effect heretofore obtained in filters of this type has been imperfect.

A further disadvantage which has heretofore existed in the use of filters of the continuous vacuum drum type and also some other types of filters is the fact that the surface of the cake on such filters is usually pitted and irregular, thereby making the cake of varying permeability and thickness. Where the wash fluids are applied as a film, the thicker portions of the cake, which may be called the high spots, receive practically no washing. And on the other hand, the depressed portions of the cake may receive an excessive washing which may dilute the wash effluent. In some cases, this disadvantage has been partially corrected by applying the wash fluids in the form of a spray, but the limit in the volume of wash fluid which may be applied in this manner is quickly reached.

One object of the invention is to provide a filter with improved means for applying the wash fluids whereby a more uniform and efficient washing of the cake is effected.

A further object of the invention is to produce a filter provided with means whereby the irregularities as formed on the surface of the cake by the vacuum and otherwise are levelled or ironed out, thereby producing a cake of substantially uniform thickness and of much more uniform texture and permeability. By the accomplishment of these objects the disadvantages above enumerated heretofore existing in the operation of filters are minimized and substantially eliminated. These objects are accomplished by the improved filter hereinafter described and particularly pointed out in the appended claims.

In the accompanying drawings Figs. 1 and 2 are respectively an end and a side elevation of a vacuum drum filter showing applied thereto the preferred form of the device of the invention; Fig. 3 is a portion of a filter drum showing a modified form of the invention; Fig. 4 is a front elevation of the rolls shown in Fig. 3 with one of the washing mats removed to show the interior construction; and Fig. 5 is an end elevation of a second modified form of the invention.

In general, the filter shown in the drawings comprises a filtering surface 10 composed of a porous substance stretched over a metal meshwork supported on the periphery of a drum 11 mounted on a hollow shaft 12. Power is supplied to the shaft in any convenient manner, whereby the filtering surface is caused to travel or move through a receptacle or compartment 13 for containing the pulp or slimes to be filtered. A vacuum is maintained at the filtering surface and this vacuum causes the pulp to adhere to the filtering surface as it passes through the pulp in the pulp compartment; and when, by the movement of the filter, that part of the filtering surface bearing the pulp passes out of the pulp compartment the vacuum filters the pulp, which is now termed the cake. The vacuum is maintained at the filtering surface by means of a pump which is connected with the filtering surface through pipes and the hollow shaft upon which the drum is mounted. The cake is removed from the filtering surface by means of a deflecting scraper 15. Just before the cake reaches the scraper the vacuum is cut off and compressed air is applied to assist in removing the cake from the filtering surface. The construction and mode of operation of the filter are so well known that further description is unnecessary.

During the passage of the cake from the point of its emergence from the pulp compartment to the scraper it sometimes undergoes a washing operation for the removal of the solution contained as moisture in the cake. The wash fluid may be simply water or it may be a barren solution. When the cake is washed with a barren solution, it may also be washed with water. The wash fluid, which is the generic term including both water and the barren solution, may be applied as a film or it may be applied to the cake in the form of a spray. The vacuum acts to draw the wash fluid through the cake thereby washing out the solution.

The means for effecting the even distribution of the wash fluid over the surface of the cake and simultaneously therewith leveling out of the irregularities in the surface of the cake consists of one or more rolls or drums located above the filter and so supported that substantially the full weight of the rolls or drums rests upon the cake. The rolls or drums are thus caused to rotate with the filter. These rolls are termed wash distributing rolls and are so constructed and arranged as to retard the flow or passage of the wash fluid down the surface of the filter. By retarding or damming the flow of the wash fluid down or over the filter, the surface of the cake is caused to be submerged or flooded with the wash fluid thereby enabling a maximum amount of fluid to be drawn through the cake by the vacuum, by which a more complete and efficient washing of the cake is secured. Moreover, the surface of the rolls is preferably covered with some absorbent material which takes up the wash fluid at the point where there is an excess and distributes it to other portions of the surface of the cake. Thus a maximum amount of the wash fluid is effectively distributed over the surface of the cake and a uniform and substantially thorough washing of the cake is obtained.

The preferred form of the invention is shown in Figs. 1 and 2. In the preferred form of the invention, a series of wash distributing rolls are applied to the ascending side of the filter and a similar series of rolls is applied to the descending side of the filter. Depending upon the conditions of operation and the size of the filter, the number of rolls in each series will vary. In the illustrated embodiment three rolls are shown as constituting each series. The two series of rolls are alike in construction and mode of operation, and it will therefore be necessary to describe only the series of rolls applied to the ascending side of the filter. This series of rolls, 17, 18 and 19 are supported in the brackets 20, 21 and 22 rising from the pulp compartment. The upper ends of the brackets are provided with slots so arranged that substantially the full weight of the rolls will rest upon the surface of the cake. The roll 17 consists of a series of relatively short spools or drums 24 and the roll 18 consists of a similar series of spools 25. The spools 24 and 25 may be solid or hollow, depending upon the nature of the wash fluids to be applied. In the illustrated form they are shown as solid cylinders of wood having cored holes and mounted to turn freely and independently of each other upon the rods 26 and 27 by which the rolls 17 and 18 are supported in place. The spools 24 are spaced apart so as to provide the channels or openings 28 through which the wash fluid may pass, and the spools 25 are spaced apart to provide the channels or openings 29. The width of the spaces 28 and 29 will vary according to conditions of operation. By reference to Fig. 2 it will be noted that the spools 24 and 25 are arranged in staggered relation to each other with respect to the passageways 28 and 29. This is to afford a tortuous passageway for the wash fluid.

Each spool is covered with a layer 23 of some absorbent substance such as felt, burlap or cocoanut matting. This covering of absorbent substance serves to gather up the wash fluid where it is in excess and convey it to other portions of the cake. To assist the covering 23 of absorbent substance in taking up and distributing additional quantities of the excess wash fluid the peripheries of the spools are provided with beveled slats 64 forming slots or pockets 65 which serve to convey wash fluid from the front of the spools to the surface of the cake immediately to the rear of the spools.

The wash fluid is applied to the surface of the cake in the form of a spray or film by means of a pipe 30 located near the top of the ascending side of the filter. The wash fluid flows toward the upper roll 17 and is retarded or dammed up by the spools 24 so as to flood or submerge the surface of the cake at this point. The excess water in front of the first roll 17 passes through the channels or passageways 28 down toward the second roll 18. The excess wash fluid from the amount retained by the second roll 18 will pass through the channels or passageways 29 between the individual spools 25 constituting the second roll 18 and flow down toward the lowermost roll 19 which is preferably a continuous cylinder. By this time the greater part of the wash fluid has been drawn through the cake by the action of the vacuum and the initial flow is regulated so that no more wash fluid is dammed up in front of the roll 19 than the vacuum can draw through the cake. If desired the rolls 17, 18 and 19 may be made hollow and the wash fluid supplied to the interior of the rolls from pipes suitably mounted.

In the form of the invention shown in Figs. 3 and 4, the wash distributing rolls 35 are hollow drums having ends or heads 36 mounted on shafts 37 confined in standards 38 rising from the pulp compartment. The periphery or surface of the rolls is provided with longitudinally arranged beveled slats 39. The slots 40 formed by the beveled slats 39 are so arranged as to carry and distribute wash fluid. The heads or ends 36 of the rolls are large enough in diameter to cover the ends of the slots so as to prevent the wash fluid from running down into the pulp compartment. To secure an even distribution of the wash fluid over the surface of the cake, each roll 35 is provided with a plurality of washing mats 42 which are secured to the rolls along one longitudinal edge only. In practice it has been found that each roll may conveniently be provided with three mats. These mats are so arranged on the roll that preferably the free edge of one mat overlaps the fastened edge of the next succeeding mat. The mats are secured to the roll along their front edge, (relatively to the direction in which the roll turns). Thus as the roll rotates synchronously with the travel of the cake, the free ends of the mats drop from the roll and fall on to the moving surface of the cake to hold a supply of wash fluid in contact therewith.

The barren solution wash is supplied from a pipe 43 to the surface of the cake near the top of the ascending side of the filter. The wash fluid may be supplied either in the form of a film or in the form of a spray. As the excess wash fluid flows down toward the pulp compartment it backs up against the upper roll and submerges or floods this part of the surface of the cake. A part of the wash fluid not drawn through the cake by the vacuum at this point is absorbed by the washing mats and the mats serve to convey this wash fluid to and hold it against an unwashed portion of the surface of the cake so that the vacuum will act upon it. Some of the excess wash fluid passes into the slots 40 and is carried around by the rotating roll and deposited on the inner side of the mat in contact with the cake. Auxiliary pipes 44 and 45 may supply additional wash fluid to the rolls 35.

In the modified form of the invention shown in Fig. 5, two wash-distributing rolls are provided at both the ascending and the descending sides of the filter. The two upper rolls 47 are confined in the standards 48 and the two lower rolls 49 are confined in the standards 50 rising from the pulp compartment. A washing mat 51 in the form of an endless belt passes over the two rolls on the ascending side of the filter and a similar washing mat 52 is passed over the two rolls on the descending side of the filter. The middle portions of the mats rest upon the surface of the cake, and the return sides of the mats are supported by flanged guide rollers 53. The mode of operation of this modified form of the invention will be clear from an inspection of Fig. 5. Wash fluid is supplied to the cake near the top of the ascending side of the filter from a pipe 55 and may also be supplied to the washing mat 51 from a second pipe 56. It is sometimes desirable to supply the surface of the mat in contact with the surface of the cake with additional wash fluid and so an auxiliary pipe 58 is provided for this purpose. Wash fluid is supplied to the surface of the cake near the top of the descending side of the filter from the pipe 59. And the bottom of the washing mat 52 may also be supplied with wash fluid from an auxiliary pipe 61.

Whether the preferred form of the invention shown in Figs. 1 and 2 or the forms of the invention shown in Figs. 3 and 4 or 5 will be used, will depend upon the circumstances and conditions of operation and the particular kind of pulp to be treated.

It will be recognized from the foregoing description that by means of the present invention the wash fluid is distributed over the cake in such manner that the cake is thoroughly and uniformly washed. A greater volume of wash fluid than has heretofore been possible may be applied without liability of diluting the pulp in the pulp compartment, and without liability of the excess escaping with the discharge. Thus a sufficient amount of wash fluid for the purpose in hand may be used without deleterious effects.

It will be understood that the invention is not to be restricted to use upon rotary drum filters inasmuch as this form of filter has been chosen simply for convenience of illustration and description in pointing out the features of the invention. It will be further understood that the construction and arrangement of the wash distributing rolls will vary according to the particular types of filters to which they are applied, and moreover, the method of and means for applying the wash fluid will vary according to conditions of operation. With some types of filters, the wash fluid will be applied externally to the wash distributing rolls and with other types of filters the wash fluid will be supplied internally to the rolls. These various forms of the invention are all within the purview of means mounted to rest upon the surface of the moving material so as to move therewith and hold in contact therewith the maximum amount of wash fluid the vacuum can draw through the filtered material.

Having thus described the invention, what I claim as new is:

1. A filter having, in combination, a continuously moving filtering surface, means for creating a vacuum at the filtering surface, means for covering the filtering surface with material to be filtered, means for supplying wash fluid to the surface of the material, and a series of rolls mounted to rest upon the surface of the material and interposed in the path of travel of the fluid, all said rolls, except the last one, being provided with channels for the passageway of the fluid past the rolls.

2. A drum filter having, in combination, a continuously moving filtering surface, means for creating a vacuum at the filtering surface, means for covering the filtering surface with material to be filtered, means located near the top of the filter for supplying wash fluid to the material, and a series of rolls mounted to rest upon the surface of the material and interposed in the path of travel of the wash fluid, the uppermost rolls being provided with channels permitting the wash fluid to flow therethrough to the next lower roll.

3. A filter having, in combination, a filtering surface, means for creating a vacuum at the filtering surface, means for covering the filtering surface with material to be filtered, means for supplying wash fluid to the filtering surface, and a plurality of rolls mounted to rest upon the surface of the material and interposed in the path of travel of the wash fluid, each of said rolls consisting of a series of spools mounted to turn independently of each other and spaced apart to permit the wash fluid to flow between them.

4. A filter having, in combination, a filtering surface, means for creating a vacuum at the filtering surface, means for covering the filtering surface with material to be filtered, means for supplying wash fluid to the surface of the material, a plurality of rolls mounted to rest upon the surface of the material and interposed in the path of travel of the wash fluid, each of said rolls consisting of a series of spools having channels between them, the channels of one roll being in staggered relation to the channels in the next roll, and a covering of absorbent material on each of the rolls.

5. A filter having, in combination, a filtering surface, means for creating a vacuum at the filtering surface, means for covering the filtering surface with material to be filtered, means for supplying wash fluid to the surface of the material, and a plurality of rolls mounted to rest upon the surface of the material and interposed in the path of travel of the wash fluid, the lowermost roll presenting a continuous surface to the wash fluid, and the upper rolls being provided with channels to permit the wash fluid to pass therethrough to the next succeeding lower roll.

6. A filter having, in combination, a filtering surface, means for creating a vacuum at the filtering surface, means for covering the filtering surface with material to be filtered, means for supplying wash fluid to the surface of the material, a roll adapted to rest upon the surface of the material and to move therewith, said roll being provided on its periphery with a series of longitudinal slots for receiving and distributing wash fluid and absorbent substance covering the surface of the roll.

7. A filter having, in combination, a filtering surface, means for creating a vacuum at the filtering surface, means for covering the filtering surface with material to be filtered, means for supplying wash fluid to the surface of the material, and a plurality of rolls mounted to rest upon the surface of the material and interposed in the path of travel of the wash fluid, the lowermost roll presenting a continuous surface to the wash fluid, and the upper rolls consisting of a series of spools mounted to turn independently of each other and spaced apart to permit the wash fluid to flow between them.

LOUIS C. ROLLS.